United States Patent
De Pasquale et al.

(10) Patent No.: US 8,423,029 B2
(45) Date of Patent: Apr. 16, 2013

(54) METHOD FOR PROVIDING AUTOMATIC CELL ACCESS CONTROL TO HIGH-PRIORITY MOBILE USERS IN OVERLOAD AND EMERGENCY SITUATIONS

(75) Inventors: Andrea De Pasquale, Madrid (ES); Francisco Javier Dominguez Romero, Madrid (ES); Kyriakos Exadaktylos, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 529 days.

(21) Appl. No.: 12/710,727

(22) Filed: Feb. 23, 2010

(65) Prior Publication Data

US 2010/0240377 A1 Sep. 23, 2010

(30) Foreign Application Priority Data

Feb. 23, 2009 (ES) ................................. 2000900495

(51) Int. Cl.
*H04W 40/04* (2009.01)

(52) U.S. Cl.
USPC .......................................... 455/445; 370/335

(58) Field of Classification Search .................. 455/453, 455/445; 370/335, 229
See application file for complete search history.

(56) References Cited

U.S. PATENT DOCUMENTS

2001/0026539 A1 10/2001 Kornprobst et al.
2002/0041578 A1* 4/2002 Kim et al. ..................... 370/335

OTHER PUBLICATIONS

3GPP: "3GPP TS 22.011 V8.5.0 (Sep. 2008); 3$^{rd}$ Generation Partnership Project; Technical Specification Group Services and System Aspects; Service accessibility (Release 8)" 3GPP TS 22.011 V8.5.0, [Online] vol. 22.011, No. v8.5.0, Sep. 1, 2008, pp. 1-26, XP002554915 Retrieved from the Internet: URL: http://www.3gpp.org/ftp/Specs/html-info/22011.htm> [retrieved on Nov. 9, 2009] *section 4.2*.

* cited by examiner

*Primary Examiner* — Phuoc Doan
(74) *Attorney, Agent, or Firm* — B. Aaron Schulman, Esq.; Nicholas B. Trenkle, Esq.; Stites & Harbison, PLLC.

(57) ABSTRACT

Method for providing automatic cell access control to high-priority mobile users in overload situation, said high-priority mobile users mapped to at least one of AC 11 to 15, comprising:
  detecting an overload situation in the mobile network, said overload situation being detected when at least one failure rate parameter exceeds a determined threshold $TH_1$ for each type of failure rate;
  carrying out at least one action to give more priority to the AC associated with said high-priority mobile users.
Said action can comprise dedicating PRACH resources specifically to the AC associated with said high-priority mobile users and/or activating access class barring for, at least, part of the users associated with any of AC 0 to 9.

14 Claims, 4 Drawing Sheets

METHOD FOR PROVIDING AUTOMATIC CELL ACCESS CONTROL TO HIGH-PRIORITY MOBILE USERS IN OVERLOAD AND EMERGENCY SITUATIONS

FIELD OF THE INVENTION

The present invention is comprised within the field of mobile telecommunications, and more specifically in providing automatic cell access control in overload and emergency situations.

BACKGROUND OF THE INVENTION

Radio Access Networks (RAN) are normally dimensioned for daily or weekly average traffic but rarely for peak traffic conditions. Based on this dimensioning, users are able to access network resources in order to establish and release their communications.

When unexpected peak traffic situations occur (e.g. in case of emergency situations like earthquake, terrorist attacks, etc.) the mobile network can become so congested that accessibility is not possible to the great majority of users.

Similar peak traffic can also occur in special events, like concerts, sport games (football, races) or similar situations in which a huge amount of people get together; and in these cases, although operators increase as much as possible the available network resources, it is not possible to design the system in order to guarantee the normal level of accessibility.

Special users like police, ambulance services, fire brigades, and special allowed staff must be able to access the network.

However, there is currently no automatic solution to cope with the problems.

The present invention automatically detects the accessibility problems caused by unexpected high traffic load and react to the situation in order to guarantee the proper accessibility to special pre-defined high priority users (user prioritization based access control).

Besides, the present invention automatically protects the excessive load by ensuring that its workload is kept lower than a pre-configurable load level able to guarantee a correct functioning of the RNC (Radio Network Controller) and Node B machine.

The invention automatically detects the accessibility problems caused by the extremely high load, reduces overload situations (e.g. signalling, CPU usage) on the network elements, automatically guarantees accessibility in emergency situations to the emergency user (e.g. rescue services, police, etc.) and measures the effectiveness of its countermeasures and adapts its behaviour to the new traffic situation as the time goes by.

The present invention acts upon two scenarios:
1. To react to the situation in order to guarantee the proper accessibility to special pre-defined high priority users (user prioritisation based access control)
2. To be able to self protect by the excessive load by ensuring that its workload is kept lower than a pre-configurable load level able to guarantee a correct functioning of the RNC and Node B machines.

In the present solution the availability of the 3GPP-defined resources for 3G system accessibility (RACH slots and signatures) is dynamically increased/decreased based on the level of system congestion (RRC and RAB allocation success rate) as well as on the detected congestion on the accessibility channels.

It is well-known that abbreviations and acronyms are frequently used in the mobile telephony field. Below is a glossary of acronyms/terms used throughout the present specification:

3GPP The 3rd Generation Partnership Project
AC Access Class
ASC Access Service Class
FDD Frequency Division Duplex
PLMN Public Land Mobile Network
PRACH Physical Random Access Channel
RAB Radio Access Bearer
RACH Random Access Channel
RAN Radio Access Network
RNC Radio Network Controller
RRC Radio Resource Control
TDD Time Division Duplex
UE User Equipment
SIM Subscriber Identity Module
U/SIM UMTS Subscriber Identity Module
UMTS Universal Mobile Telecommunications System

DESCRIPTION OF THE INVENTION

The invention relates to a method for providing automatic cell access control to high-priority mobile users in overload and emergency situations according to claim 1. Preferred embodiments of the method are defined in the dependent claims.

In the method of the present invention the high-priority mobile users are mapped to at least one of AC 11 to 15. The method comprises:
detecting an overload situation in the mobile network, said overload situation being detected when at least one failure rate parameter exceeds a determined threshold $TH_1$ for each type of failure rate;
carrying out at least one action to give more priority to the AC associated with said high-priority mobile users.

The at least one action to give more priority to the AC associated with said high-priority mobile users preferably comprises dedicating PRACH resources (preferably at least PRACH signatures or PRACH sub-channels) specifically to the AC associated with said high-priority mobile users.

In a preferred embodiment the overload situation is detected when either the RRC connection failure rate or RB setup failure rate or PRACH collisions failure rate exceeds determined thresholds ($THRC_1$, $THRB_1$, $THRP_1$) for each type of failure rate.

The method can also comprise:
if at least one failure rate parameter exceeds threshold $TH_1$ but not a second threshold $TH_2$, activating a $1^{st}$ AC differentiation for dedicating PRACH resources specifically to the AC associated with said high-priority mobile users;
if at least one failure rate parameter exceeds threshold $TH_1$ and the second threshold $TH_2$, activating a $2^{nd}$ AC differentiation for dedicating more PRACH resources than in the $1^{st}$ AC differentiation specifically to the AC associated with said high-priority mobile users.

In the case that at least one failure rate parameter has exceeded its corresponding threshold $TH_1$, the method can also comprise:
when said at least one failure rate parameter goes down its corresponding threshold $THRhyst_1$, the $1^{st}$ AC differentiation is removed.

In the case that at least one failure rate parameter has exceeded its corresponding threshold $TH_2$, the method can also comprise:
when said at least one failure rate parameter goes down its corresponding threshold $THRhyst_2$, activating the $1^{st}$ AC differentiation.

The $1^{st}$ AC differentiation preferably comprises dedicating PRACH signatures initially mapped to ASC 1 to the ASC associated with the high-priority mobile users.

The 2$^{nd}$ AC differentiation preferably comprises dedicating PRACH signatures and sub-channels initially mapped to ASC 1 to the ASC associated with the high-priority mobile users.

In another preferred embodiment the at least one action to give more priority to the AC associated with the high-priority mobile users comprises activating access class barring for, at least, part of the users associated with any of AC 0 to 9. In that case the method can also comprise:

if at least one failure rate parameter exceeds a restricting threshold (THRO$_B$, THRB$_B$), restricting the access to at least one access class belonging from AC1 to AC9.

The restriction can be applied to all the access classes defined within a range X$_{range}$ or it can be applied sequentially, according to a restriction interval T$_R$, and repeatedly to different groups of access classes.

BRIEF DESCRIPTION OF THE DRAWINGS

A series of drawings which aid in better understanding the invention and which are expressly related with an embodiment of said invention, presented as a non-limiting example thereof, are very briefly described below.

Figure 1:
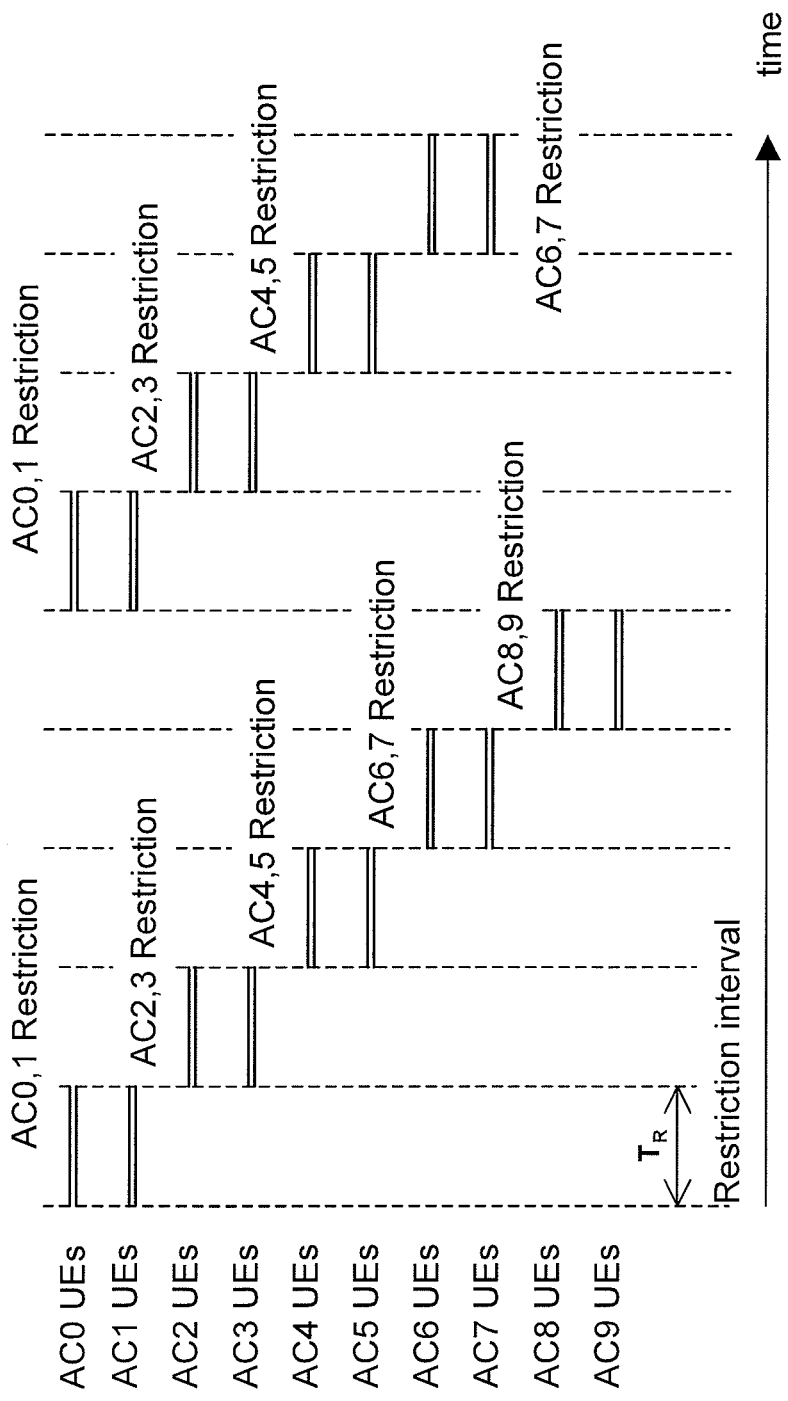
FIG. 1 shows access restriction mechanism for 10 access classes in a range X$_{range}$.

DESCRIPTION OF A PREFERRED
EMBODIMENT OF THE INVENTION

According to the 3GPP standard 22.011, section 4, all UEs (User Equipments) are members of one of the ten randomly allocated mobile populations, defined as Access Classes (AC) 0 to 9. The population number is stored in the SIM/USIM. In addition, mobiles may be members of one or more of the 5 special categories (Access Classes 11 to 15), also held in the SIM/USIM. These are allocated to specific high priority users as follows. (The enumeration is not meant as a priority sequence):

Class 15—PLMN Staff;
Class 14—Emergency Services;
Class 13—Public Utilities (e.g. water/gas suppliers);
Class 12—Security Services;
Class 11—For PLMN Use.

In this way, the mobile terminal and the network can know in the SIM/USIM which kind of access class the user is.

This invention proposes to give more priority to this kind of special users. The only way that the network can give more priority is in the PRACH procedure. A preferred implementation of the algorithm is explained in the next paragraphs.

The triggering of the algorithm is the statistics per cell, in particular the RRC connection failure rate, the Radio Bearer Setup failure rate and the PRACH collisions failure rate. In this way the algorithm will act only in very congested situations, in which there are many users trying to access to the network.

When the failure increases and exceeds a threshold, then the algorithm starts to act. There can be several thresholds: in every one it is increased the priority of the special users and decrease the priority of the normal users. The present invention proposes different resolutions (A, B and C) to act upon the two different scenarios, Scenario 1 (to guarantee the proper accessibility to special pre-defined high priority users) and Scenario 2 (to protect against the excessive load by ensuring that the workload is kept lower than a pre-configurable load level able to guarantee a correct functioning of the RNC and Node B machines)

Resolution A. Access Control to Prioritise Special Users in Overload Situations

An example of a preferred algorithm is described here. Taking into account the PRACH procedure, it is possible to give more access probability to the special users (with AC 11 to 15).

According to the 3GPP standards, the AC 11 to 15 are mapped to the Access Service Classes (ASC) 2 to 7, and the rest of the users with Access Class from 0 to 9 are mapped to the ASC 1.

|     | AC  |     |     |     |     |     |     |
| --- | --- | --- | --- | --- | --- | --- | --- |
|     | 0-9 | 10  | 11  | 12  | 13  | 14  | 15  |
| ASC | 1st IE | 2nd IE | 3rd IE | 4th IE | 5th IE | 6th IE | 7th IE |

IE: Information Element

The pseudocode of the invention algorithm is as follows, where THRC indicates a threshold for the RRC messages, THRB for the Radio Bearer messages, THRP a threshold for the PRACH collisions.

When several thresholds for the same messages are used, we indicate, e.g. THRC1, THRC2, etc.

```
If RRC Connection Failure rate < THRC₁ AND RB Setup Failure
   rate < THRB₁ AND PRACH collisions failure rate < THRP₁ then
      No priority differentiation: All ASC have ALL signatures and
      ALL sub-channels available
Else if RRC Connection Failure rate > THRC₂ OR RB Setup Failure
   rate > THRB₂ OR PRACH collisions failure rate > THRP₂
      2ⁿᵈ AC differentiation:
         ASC 1 → Signatures from 0 to X
         ASC 2 - 7 → signatures from X+1 to 15
         ASC 1 → sub-channels from 0 to Y
         ASC 2 - 7 → sub-channels from Y+1 to 12
      Else
         1ˢᵗ AC differentiation:
            ASC 1 → Signatures from 0 to X
            ASC 2 - 7 → signatures from X+1 to 15
End
```

Signatures and Sub-channels of the PRACH procedure (taken from the 3GPP specs) are included for ease of reading in the later section called "PRACH procedure in 3G".

With the first prioritisation, some signatures are dedicated to the special users, so the probability of receiving OK is higher.

With the use of the sub-channels, it is not possible a collision between normal users and special users, so it is easier for the special users to access the network.

There could be more thresholds to increase the priority of the special users. For example:

```
If RRC Connection Failure rate > THRC_N OR RB Setup Failure
rate > THRB_N OR PRACH collisions failure rate > THRP_N
   Nⁿᵈ AC differentiation:
      ASC 0 → Signatures 0 and sub-channel 0
      ASC 2 - 7 → Signatures 1 to 15 and sub-channels from 1 to 12
End
```

Figure 4:
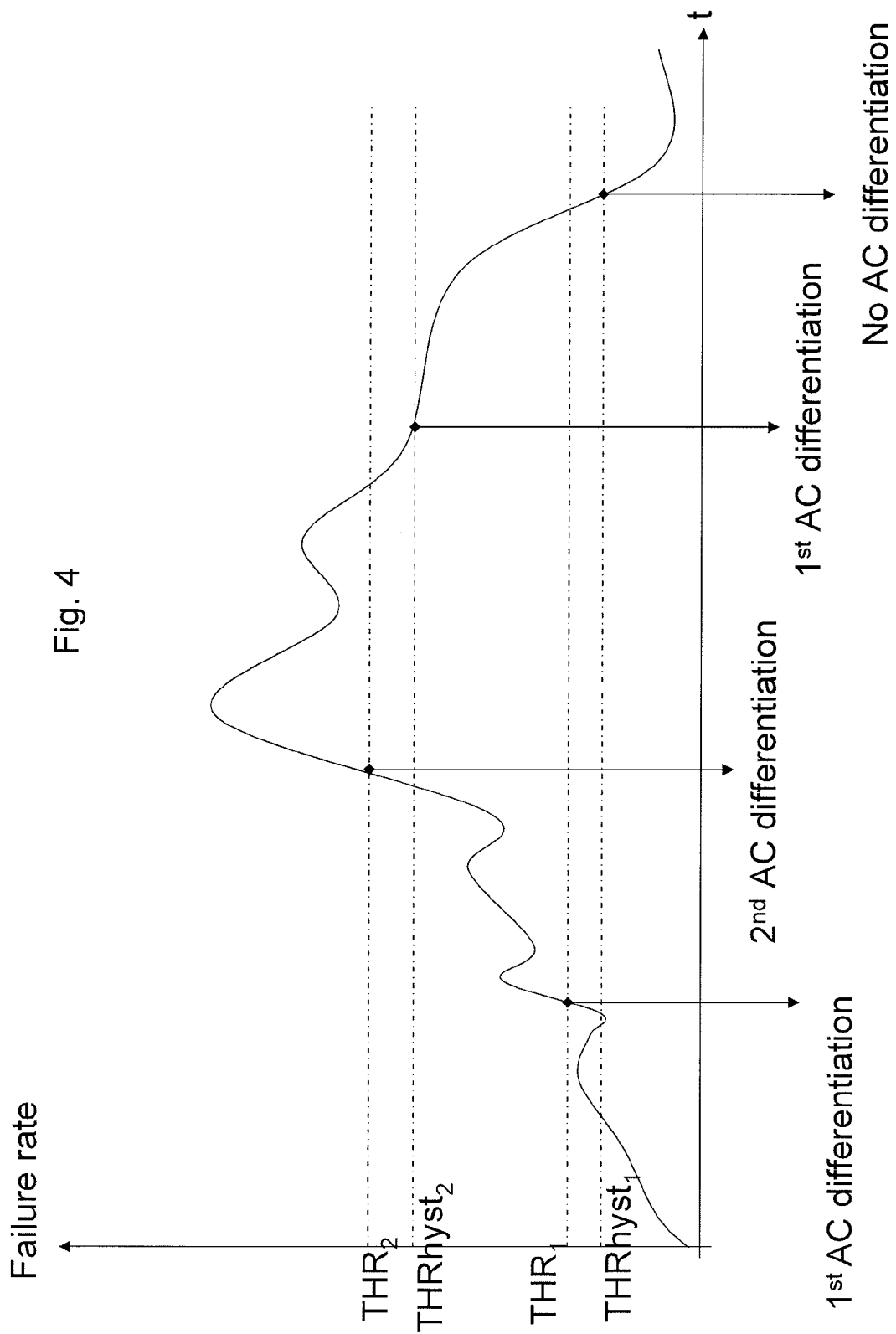
FIG. 4 shows the activation of the AC differentiations when a failure rate exceeds determined thresholds, and deactivation of the AC differentiations when the failure rate goes below other determined thresholds.

In the same way, when the failure rate goes down respect to the previous thresholds with certain hysteresis (THRhyst$_1$, THRhyst$_2$), the AC differentiation is changed, and even removed (see FIG. 4).

In summary, to give more priority it is a question of dedicating more signatures and more sub-channels to the special Access Class users.

Resolution B. Network Elements Control Through Access Class Barring

According to the function of the previous algorithm the normal users have always possibility of accessing to the network because they have always a signature and a sub-channel available to try to access.

So, if there are a big amount of users, they could still congest and collapse the cell.

The solution for this case is the implementation of an automatic Access Class

Restriction per cell. This algorithm is triggered when the RRC connection failure or RB setup failure exceeds thresholds ($THRC_B$, $THRB_B$), which are preferably higher than in the previous algorithm as this is a more restricted way of avoiding the access of normal users, so it should be applied when the network congestion situation is becoming critical.

Restriction can be implemented in the range $X_{range}$ of the access classes from 0 to 9, within the access class restriction interval $T_R$ instead of applying control to all subscribers. This Access Class barring is indicated in the System Information messages, forbidding the network access to the mobiles with the indicated AC. According to the 3GPP specs, when an AC is forbidden, the mobiles which SIM/USIM has said AC will not even start the PRACH procedure, meaning that will not try to access the network (therefore not increasing the network load in terms of RRC messages, RB assignment and overall network traffic).

The operator shall be able to define two different modes of operation:

Mode 1: Restriction applies immediately to all the access classes defined within the range $X_{range}$.

Mode 2: Restriction applies sequentially in the access classes defined in the range $X_{range}$, during the restriction interval $T_R$. This sequence is set by an X percentage of restriction from 0% to 100% with 10% step, called $X_{start}$. For example, if 10 access classes are defined in the range $X_{range}$, 10% is one access class, 20% is two access classes and 100% is all access classes. This means that during $T_R$ seconds (or minutes), if X=20%, Access classes 0 and 1 will be forbidden, than in next $T_R$ period the mobiles whose SIM/USIM have AC 0 and 1 will be able to start PRACH procedure again, whist AC 2 and 3 will be forbidden, meaning that the mobiles which SIM/USIM have AC 2 and 3 will not be able to start any PRACH procedure.

FIG. 1 shows a 20% access restriction example.

The system will check every period of $G*T_R$ seconds or minutes (G is an integer value from 1 to 100) if the RRC connection failure or RB setup failure become lower than the threshold that triggered the algorithm.

If this is not the case, the value X is increased by a so called X-step and the restriction is now applied to a wider set of ACs.

At the next check, if the RRC or RB failure rate is still high, X will be increased again until the maximum value.

When both the RRC connection failure or RB setup failure become lower than $THRChyst_B$ and $THRBhyst_B$ respectively, the value X will be decreased by X-step if it had been increased in the first round of the algorithm from $X_{start}$, and the new system load will be checked after $S*T_R$ period.

When X value is back to $X_{start}$ value, if the RRC connection failure or RB setup failure remain below $THRChyst_B$ and $THRBhyst_B$ thresholds, the algorithm is disabled and all AC classes can finally access the system.

Resolution C. Combination of Access Class Barring and Access Class Prioritisation The third solution is to combine both algorithms, depending on the failure rates commented before. In this way it is possible to increase the priority of the special users to access the network and simultaneously to restrict the access to some AC with the barring solution B algorithm.

Figure 2:
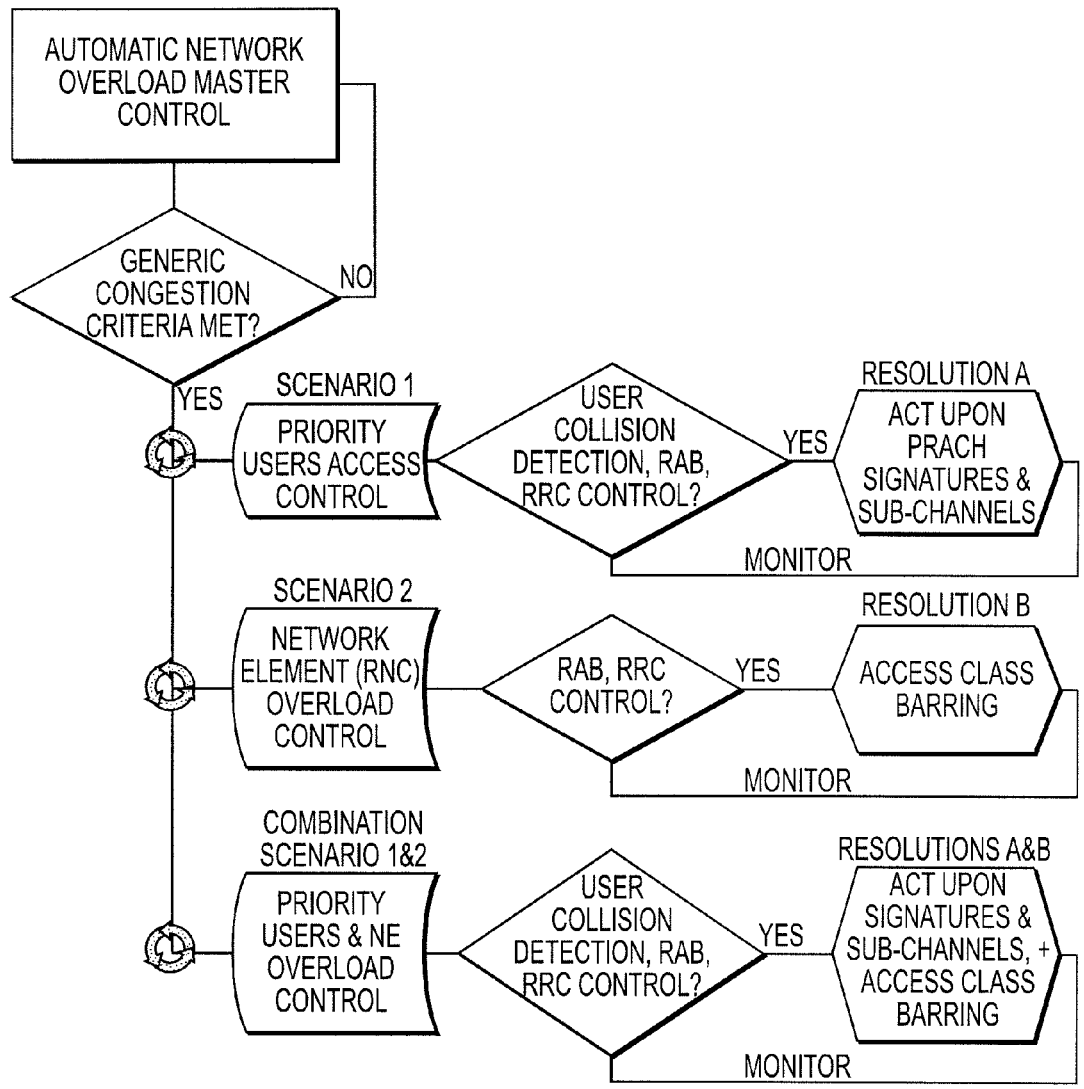
FIG. 2 shows a flow diagram of the algorithm proposed by the invention.

FIG. 2 shows a flow diagram representing the algorithm including the Resolutions A, B and C.

PRACH Procedure in 3G

As commented previously Access Classes shall only be applied at initial access, i.e. when sending an RRC CONNECTION REQUEST. That means in the access to the PRACH (Physical Random Access Channel) procedure.

In 3GPP standard 25.331, chapter 8.5.13, a mapping between Access Class (AC) and Access Service Class (ASC) shall be indicated by the information element "AC-to-ASC mapping" in System Information Block type 5 or System Information Block type 5bis. The correspondence between AC and ASC shall be indicated as follows.

| | AC | | | | | | |
|---|---|---|---|---|---|---|---|
| | 0-9 | 10 | 11 | 12 | 13 | 14 | 15 |
| ASC | 1st IE | 2nd IE | $3^{rd}$ IE | 4th IE | 5th IE | 6th IE | 7th IE |

For the random access, the parameters implied by the respective ASC shall be employed. In case the UE is member of several ACs it shall select the ASC for the highest AC number. In connected mode, AC shall not be applied.

The PRACH resources (i.e. access slots and preamble signatures), may be divided between different Access Service Classes in order to provide different priorities of RACH usage. It is possible for more than one ASC or for all ASCs to be assigned to the same access slot/signature space.

Access Service Classes shall be numbered in the range $0<=i<=NumASC<=7$ (i.e. the maximum number of ASCs is 8). An ASC is defined by an identifier, i, that defines a certain partition of the PRACH resources and an associated persistence value Pi. A set of ASC parameters consists of "NumASC+1" such parameters (i, Pi), i=0, ..., NumASC.

PRACH partitions shall be established using the information element "PRACH partitioning". The persistence values Pi to be associated with each ASC shall be derived from the dynamic persistence level N=1, ..., 8 which is broadcast in System Information Block 7, and the persistence scaling factors $s_i$, broadcast in System Information Block Type 5 or System Information Block type 5bis and possibly also in System Information Block Type 6, as follows:

| | ASC # i | | | | | | |
|---|---|---|---|---|---|---|---|
| | 0 | 1 | 2 | 3 | 4 | 5 | 6 | 7 |
| $P_i$ | 1 | P(N) | $s_2$ P(N) | $s_3$ P(N) | $s_4$ P(N) | $s_5$ P(N) | $s_6$ P(N) | $s_7$ P(N) | where $P(N)=2^{-(N-1)}$.

Scaling factors $s_i$ are provided optionally for i=2, ..., NumASC, where NumASC+1 is the number of ASCs as defined by PRACH partitioning. If no scaling factors are broadcast, default value 1 shall be used if NumASC>=2.

The persistence probability value controls the timing of RACH transmissions at the level of radio frame intervals. When initiating RACH transmission, having received the necessary system information for the chosen PRACH and established the relevant Pi, the terminal draws a number r randomly between 0 and 1. If $r \leq Pi$, the physical layer PRACH transmission procedure is initiated. Otherwise, the initiation of the transmission is deferred by 10 ms, then a new random experiment is performed, and so on, until $r \leq Pi$. During this procedure, the terminal monitors downlink control channels for information and takes updates of the RACH control parameters into account.

Figure 3:
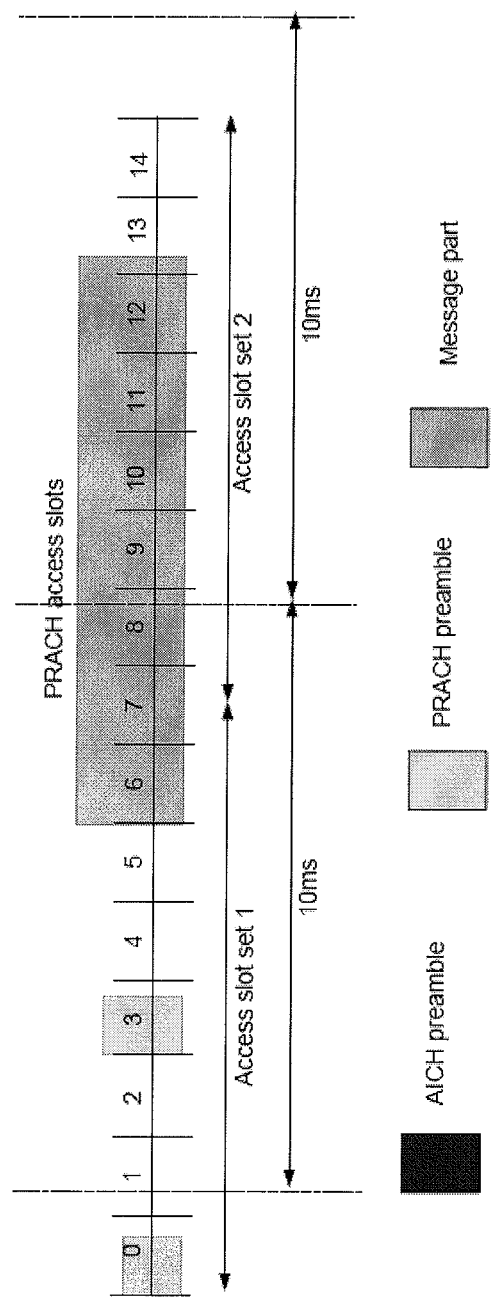
FIG. 3 shows the timing relationship in the PRACH channel.

In FIG. 3 it is shown the timing relationship in the PRACH channel. There are 15 slots and every user repeats a PRACH preamble until it gets an Acquisition Indicator to transmit the message part.

The access slots are split between 12 RACH subchannels, hence every 12th access slot pertains to a specific subchannel. Several subchannels may be associated with any one of up to 16 different PRACHs signatures, similarly several or all sub-channels associated with that PRACH may be used by a particular ASC.

The 15 access slots are split into two access slots, the first eight slots are associated with set one, the other seven with set 2, as illustrated in FIG. 3.

In summary, the parameters depending on the ASC (which controls the priority of the users) are:

Signature Start and End: As commented before, there are 16 possible signatures which are different coding that can allow transmitting more than 1 user in the same slot. If one ASC class has dedicated signatures, then it is not possible to have a collision with other class of users from code point of view.

Assigned Sub-channel number: Every ASC can be allocated one or more sub-channel numbers. There are 12 subchannels. Every sub-channel can be allocated to one or more ASC. To give more priority to the high Access Class users, it is possible to dedicate some sub-channels; in this way, the normal users will not transmit any PRACH preamble in said dedicated sub-channels.

The invention claimed is:

1. Method for providing automatic cell access control to high-priority mobile users in overload situations, said high-priority mobile users mapped to at least one of Access Class (AC) 11 to 15, the method comprising:
    detecting an overload situation in a mobile network, said overload situation being detected when at least one failure rate parameter exceeds a determined threshold $TH_1$ for a type of failure rate corresponding to the failure rate parameter; and
    upon the overload situation being detected, carrying out at least one action to give more priority to the at least one AC associated with said high-priority mobile users.

2. Method for providing automatic cell access control to high-priority mobile users in overload situations according to claim 1, characterized in that the at least one action to give more priority to the at least one AC associated with said high-priority mobile users comprises dedicating Physical Random. Access Channel (PRACH) resources specifically to the at least one AC associated with said high-priority mobile users.

3. Method for providing automatic cell access control to high-priority mobile users in overload situations according to claim 2, characterized in that the PRACH resources specifically dedicated to the high-priority mobile users are at least PRACH signatures.

4. Method for providing automatic cell access control to high-priority mobile users in overload situations according to claim 2, characterized in that the PRACH resources specifically dedicated to the high-priority mobile users are at least PRACH sub-channels.

5. Method for providing automatic cell access control to high-priority mobile users in overload situations according to claim 2, characterized in that the overload situation is detected when either a Radio Resource Control (RRC) connection failure rate or Radio Bearer (RB) setup failure rate or PRACH collisions failure rate exceeds determined thresholds ($THRC_1$, $THRB_1$, $THRP_1$) for the type of failure rate.

6. Method for providing automatic cell access control to high-priority mobile users in overload situations according to claim 2, characterized in that it comprises:
    if at least one failure rate parameter exceeds the threshold $TH_1$ but not a second threshold $TH_2$, activating a $1^{st}$ AC differentiation for dedicating PRACH resources specifically to the at least one AC associated with said high-priority mobile users; and
    if at least one failure rate parameter exceeds the threshold $TH_1$ and the second threshold $TH_2$, activating a $2^{st}$ AC differentiation for dedicating more PRACH resources than in the $1^{st}$ AC differentiation specifically to the at least one AC associated with said high-priority mobile users.

7. Method for providing automatic cell access control to high-priority mobile users in overload situations according to claim 6, in which at least one failure rate parameter has exceeded its corresponding threshold $TH_1$, characterized in that it comprises:
    when said at least one failure rate parameter goes below its corresponding threshold $TH_1$, the $1^{st}$ AC differentiation is removed.

8. Method for providing automatic cell access control to high-priority mobile users in overload situations according to claim 6, in which at least one failure rate parameter has exceeded its corresponding threshold $TH_2$, characterized in that it comprises:
    when said at least one failure rate parameter goes below its corresponding threshold $TH_2$, activating the $1^{st}$ AC differentiation.

9. Method for providing automatic cell access control to high-priority mobile users in overload situations according to claim 6, characterized in that the $1^{st}$ AC differentiation comprises dedicating PRACH signatures initially mapped to Access Service Class (ASC) 1 to an ASC associated with the high-priority mobile users.

10. Method for providing automatic cell access control to high-priority mobile users in overload situations according to claim 6, characterized in that the $2^{nd}$ AC differentiation comprises dedicating PRACH signatures and sub-channels initially mapped to ASC 1 to an ASC associated with the high-priority mobile users.

11. Method for providing automatic cell access control to high-priority mobile users in overload situations according to claim 1, characterized in that the at least one action to give more priority to the at least one AC associated with the high-priority mobile users comprises activating access class barring for, at least, part of the users associated with any of AC 0 to 9.

12. Method for providing automatic cell access control to high-priority mobile users in overload situations according to claim 11, characterized in that it comprises:
    if at least one failure rate parameter exceeds a restricting threshold ($THRC_B$, $THRB_B$), restricting the access to at least one access class from AC1 to AC9.

13. Method for providing automatic cell access control to high-priority mobile users in overload situations according to claim 12, characterized in that the restriction is applied to all the access classes defined within a range $X_{range}$.

14. Method for providing automatic cell access control to high-priority mobile users in overload situations according to claim 12, characterized in that the restriction is applied sequentially, according to a restriction interval $T_R$, and repeatedly to different groups of access classes.

* * * * *